(12) United States Patent
Grabau (10) Patent No.: US 10,209,483 B2
(45) Date of Patent: Feb. 19, 2019

(54) MOTORIZED ADJUSTING DRIVE FOR OBJECTIVES

(71) Applicant: Leica Camera AG, Wetzlar (DE)

(72) Inventor: Torsten Grabau, Wetzlar (DE)

(73) Assignee: Leica Camera AG, Wetzlar (DE)

( * ) Notice: Subject to any disclaimer, the term of this patent is extended or adjusted under 35 U.S.C. 154(b) by 111 days.

(21) Appl. No.: 15/038,670

(22) PCT Filed: Nov. 23, 2014

(86) PCT No.: PCT/DE2014/100411
§ 371 (c)(1),
(2) Date: May 23, 2016

(87) PCT Pub. No.: WO2015/074647
PCT Pub. Date: May 28, 2015

(65) Prior Publication Data
US 2016/0291286 A1    Oct. 6, 2016

(30) Foreign Application Priority Data

Nov. 24, 2013  (DE) .................. 10 2013 112 957
Jun. 26, 2014  (DE) .................. 10 2014 108 969

(51) Int. Cl.
*G02B 7/02*    (2006.01)
*G02B 7/10*    (2006.01)
*G02B 7/08*    (2006.01)

(52) U.S. Cl.
CPC .............. *G02B 7/102* (2013.01); *G02B 7/08* (2013.01)

(58) Field of Classification Search
CPC .......... G02B 7/005; G02B 7/023; G02B 7/08; G02B 7/102; G02B 27/0062;
(Continued)

(56) References Cited

U.S. PATENT DOCUMENTS 5,978,161 A * 11/1999 Lemke ............... A61B 1/00188
                                                        359/824
7,995,287 B2 *  8/2011 Naitou .................. G02B 7/102
                                                        359/694
(Continued)

FOREIGN PATENT DOCUMENTS

DE       197 18 189 A1    11/1997
EP       1 841 048 A2     10/2007
(Continued)

OTHER PUBLICATIONS

International Search Report (PCT/ISA/210) issued in PCT Application No. PCT/DE2014/100411 dated Mar. 19, 2015 with English translation (five pages).
(Continued)

*Primary Examiner* — Mustak Choudhury
(74) *Attorney, Agent, or Firm* — Crowell & Moring LLP (57) ABSTRACT

An objective arrangement includes an outer holder, and optical elements held therein, in an inner holder. A rotor is configured as a cylinder element forming a circumferential groove, having permanent-magnet elements disposed on at least one inner wall surface. A stator consists of a cylindrical coil, which inserted into the groove, locally fixed in the axial direction, for an electromagnetic interaction with the magnet elements, coaxially to the axis of rotation of a curved support. The curved support is arranged separate from the outer holder and the inner holder.

10 Claims, 9 Drawing Sheets

(58) Field of Classification Search
CPC .......... G02B 27/0955; G02B 23/2453; G02B 23/2476; G02B 13/009; G02B 13/0075; G03B 9/14; G03B 3/10; G03B 5/00; H02K 1/27; H02K 1/274; H02K 1/2786; H02K 3/26; H02K 3/47; H02K 21/12; A61B 1/0008; A61B 1/00188; H04N 5/23296; H04N 5/2253; H04N 5/2254; H04N 5/2257; H04N 5/23212
USPC .......... 359/808–830; 310/179, 180, 266; 369/13.17; 358/E5.028; 396/75, 133
See application file for complete search history.

(56) References Cited

U.S. PATENT DOCUMENTS

| | | | |
|---|---|---|---|
| 2005/0264899 A1* | 12/2005 | Manabe | G02B 7/102 359/811 |
| 2007/0200452 A1 | 8/2007 | Graham et al. | |
| 2008/0025159 A1* | 1/2008 | Takayama | A61B 1/0008 369/13.17 |

FOREIGN PATENT DOCUMENTS

| | | |
|---|---|---|
| EP | 1 884 813 A1 | 2/2008 |
| EP | 1 166 424 B1 | 6/2010 |

OTHER PUBLICATIONS

German-language Written Opinion (PCT/ISA/237)) issued in PCT Application No. PCT/DE2014/100411 dated Mar. 19, 2015 (five pages).

International Preliminary Report on Patentability (PCT/IB/338 & PCT/IB/373) issued in PCT Application No. PCT/DE2014/100411 dated May 24, 2016, including English translation of document C2 (German-language Written Opinion (PCT/ISA/237)) previously filed on May 23, 2016 (6 pages).

* cited by examiner

MOTORIZED ADJUSTING DRIVE FOR OBJECTIVES

The invention relates to an objective having an electric-motor drive for adjustment of optical elements along an optical axis, in accordance with the preamble of claim 1.

BACKGROUND

Electric-motor drives are known in various embodiments for focusing and adjusting the focal length of photographic objectives. In this regard, compact DC motors having a small construction, ultrasound motors, and stepper motors having gear mechanism units are primarily used.

Likewise, ultrasound motors that are configured as ring motors and disposed on the circumference of a holder of an objective are known as drives. Ring motors generally drive the focusing elements and focal length adjustment elements provided for axial adjustment in the axial direction, using a gear mechanism translation. They require a complicated electronic controller with high electrical voltages. Mechanical friction between stator and rotor causes contamination in the interior of the objective tube and impairs the image performance due to deposits on the optical elements.

An apparatus for an axial position change of an optical imaging system is known from document DE 197 18 189 A1. The optical imaging system is disposed within a carrying ring that is guided in a housing so as to be longitudinally displaceable. Magnet elements are disposed on the outer circumference surface of the carrying ring, which elements follow a magnetic field controllably disposed on the outer circumference of the housing, and thereby axially displace the carrying ring together with the imaging system.

From EP 1 884 813 A1, an electromagnetic drive for axial adjustment of an optical imaging system held in a holder is known. The electric motor drive consists of a coil arrangement wound parallel to the optical axis of the imaging system, and a permanent magnet that engages around the optical axis as an arc segment. The coil arrangement and the permanent magnet have a common iron back network. When current is applied to the coil winding, it moves over the arc segment of the permanent magnet and in doing so adjusts the holder of the optical imaging system by way of a pin/slot coupling guided in a curved support.

SUMMARY

It was the task of the invention to create a maintenance-free and low-noise drive for axial positioning of moving elements in an objective tube, which drive can be used without a motor gear mechanism, for translation of the motor speed of rotation into a focusing movement. It was a further task to make available a drive system having a better degree of efficiency in the conversion of electrical energy to mechanical movement energy, which system avoids the disadvantages of the drive according to the state of the art. The great volume and the high mass were supposed to be reduced.

This task is accomplished by means of an objective having a holder and a drive in accordance with the characterizing part of claim 1. Advantageous further developments and embodiments are the object of the dependent claims. In advantageous manner, the drive is configured as an electric-motorized brushless hollow-shaft drive. In this manner, a low-noise motor is implemented, which simultaneously has a compact construction.

An essential recognition is the suitability for use of such a hollow-shaft drive for motorized adjustments in optical systems, such as, for example, objectives, oculars, monocular or binocular long-range optical devices. The invention makes use of the recognition that the inside diameter of a hollow-shaft motor, which is open throughout, can be utilized for optical elements held in an inner holder and mounted within the motor, by way of a curved support, so as to move, wherein the hollow-shaft motor drives the curved support and the inner holder, by itself, can be linearly guided.

The energy density in conventional hollow-shaft motors is advantageously increased by means of strong permanent magnets as parts of the rotor, such as, for example, neodymium magnets, which are produced from NdFeB materials. The motor has a very slim design, because of the use of a very thin-walled cylinder coil as a stator (the thickness of the wall of the cylinder amounts to less than 10% of the open diameter). The construction space for optical elements moved within the hollow shaft can advantageously be used for large lens diameters. The cylinder coil is fixed in place in the system and acts as a stator. In this manner, it is possible to do without the use of sliding contacts for transfer of the electrical energy to the coils. This measure guarantees a low-noise motor.

The coil can consist, for example, of two metal sheets formed into cylinders, wherein conductor track structures consisting of copper alloys, for example, are introduced into the metal sheets, and produced by laser methods or etching methods. The cylinders are inserted into one another, relative to one another, using an additional electrically insulating intermediate layer, to form what is called a "composite stator." Windings are produced by means of vias between inner and outer cylinder. Subsequently, the cylinder body, formed from unstable coil parts, can have a support material cast around it to increase the mechanical stability (strength).

Alternatively, coil elements composed of wire can be wound onto the cylindrical auxiliary body. Subsequently, the coils can have a support material cast around them, for example epoxy resin or fiber-reinforced fiberglass.

In this manner, three or even more coil elements can be implemented within the cylinder body. For example, vias can be set according to a triple-offset plan, in which the offset third windings are all connected with one another. In this manner, three separate phases or coils are formed in a shape-stable, slim cylinder body.

Using this method, a very slim and shape-stable, thin and tubular coil arrangement formed from individual coil elements is formed, which arrangement has multiple contacts for feed of control currents on its face side.

The individual coil elements are distributed over the circumference of the cylinder at regular intervals and in this way form a cylinder coil.

In this regard, the cylinder coil is formed from separately controllable individual windings or grouped coils brought together in groups, wherein the individual windings or grouped coils are controlled in known manner to produce a migrating electromagnetic field.

The number of grouped coils can be adapted to the magnets disposed on the circumference of the rotor with alternating polarities, and to a required precision of a torque.

A brushless, rotationally positionable, permanent-magnet-excited direct-current motor can be implemented.

For example, a rotating magnetic field can be generated with three phase-shifted, alternately switched direct currents at three coil groups, where the rotor, equipped with magnets, follows this field. In this regard, the three coil groups can be adapted to the magnets alternately distributed in the rotor and uniformly distributed over its circumference.

The cylinder coil can be configured and produced in accordance with European Patent EP 1 166 424 B1, for example. Operation and control of a cylinder coil described there are also disclosed there. A further embodiment of such a thin-walled cylinder coil can be derived from EP 1 841 048 A2 and is proof of the implementability of the present invention. Explicit reference is made to the contents of these documents.

A brushless motor consisting of the elements of the thin coil described as a stator and a rotor equipped with permanent magnets is described in US 2007/0200452 A1. For improved time-related control of three-phase control signals at the stator, the fixed arrangement of Hall effect sensors is provided at the stator.

For axial position determination of the displaceable optical elements, such as, for example, a focusing element, systems that measure incrementally or absolutely are provided in or on the holder.

End-position sensors are used for detection of the end position.

End-position sensors are understood to be sensors for the detection of end positions in the axial direction, wherein photoelectric sensors, inductive or capacitative proximity sensors or mechanical sensing devices can be used. They can be attached to all the moving mechanical parts by means of suitable coupling.

A sensor disposed in a fixed location on the objective holder and a bar ruler affixed to the circumference of the focusing element, for example, can be used as an incrementally measuring system.

An exemplary embodiment will be described schematically, using the drawing. In this regard, the figures show:

BRIEF DESCRIPTION OF DRAWINGS

FIG. 1a an objective in cross-section,
FIG. 1b a detail enlargement thereof,
FIG. 1c a further enlargement of the detail,
FIG. 2a a variant of the objective according to FIG. 1 in cross-section,
FIG. 2b a detail enlargement thereof,
FIG. 2c a representation of the arrangement with permanent-magnet elements,
FIG. 3 a further variant in the region of the hollow-shaft drive,
FIG. 4 a view of the linear guide,
FIG. 5 a view of the curved support with bar ruler,
FIG. 6 a perspective representation of the curved support with bar ruler,
FIG. 7 a perspective representation of the holder of the variant according to FIG. 2,
FIG. 9 a view of the curved support of the objective in cross-section, and
FIG. 10 schematic diagram of the objective in cross-section.

DETAILED DESCRIPTION OF EMBODIMENTS

Figure 1A:
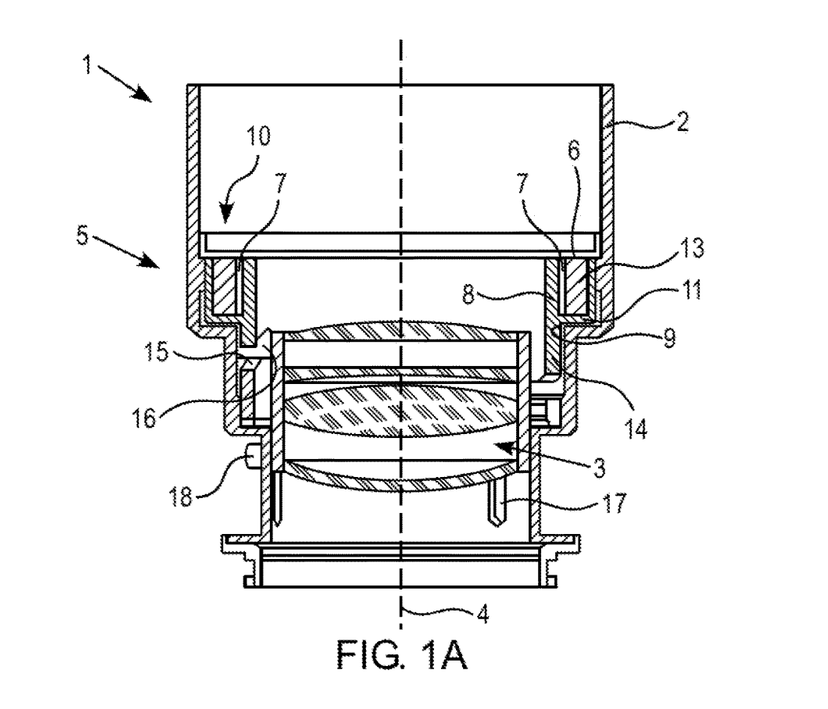

FIG. 1a shows an objective 1 having a holder 2, in which an optical element 3 is mounted so as to be axially displaceable by an electric motor along an optical axis 4. To adjust the optical element 3, a hollow-shaft drive 5 that engages around the axis 4 in ring shape is provided.

The hollow-shaft drive 5 consists of a stator 6 connected with the holder 2 in locally fixed manner, having a cylindrical thin-walled coil 7, and a rotor 9 configured as a hollow shaft 8 mounted so as to rotate.

A cylinder element 11 composed of soft-magnetic material forming a circumferential groove 10 is formed onto the outer wall of the hollow shaft 8. Permanent magnets 13 for electromagnetic interaction with the coil 7 are disposed on the inner wall surface 12 of the cylinder element 11 shown in greater detail in FIG. 1c, in the groove 10. A magnetic circuit is formed by the cylinder element 11 with magnets 13 and coil 7. The coil 7 is disposed in the groove 10 coaxially to the axis of rotation of the hollow shaft 8. The axis of rotation of the hollow shaft 8 is identical to the optical axis 4. The hollow-shaft drive 5 has a curved support 14.

A curved contour 15 is introduced into the curved support 14, on the circumference, rising in the axial direction, into which contour the guide elements 16 connected with the optical element 3 engage. The optical element 3 simultaneously stands in an active connection with a linear guide 17 disposed parallel to the optical axis 4, by means of linear guide elements 18, and is prevented from rotating about the optical axis 4. When the curved support 14 is rotated, the optical element 3 is displaced along the optical axis 4, in the axial direction, without any rotational movement, in this manner.

Figure 1B:
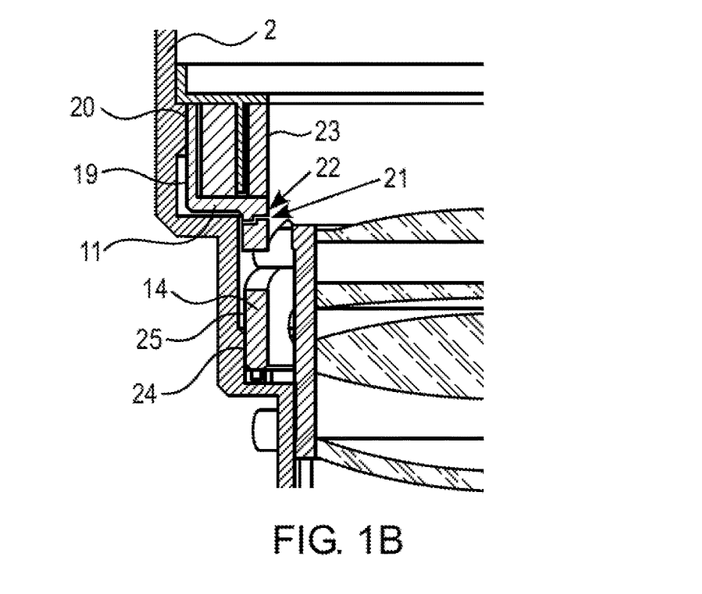

FIG. 1b shows a detail enlargement of the hollow-shaft drive 5 from FIG. 1a.

The outer circumference surface 19 of the cylinder element 11 is mounted in the holder 2 so as to rotate. For this purpose, the holder 2 has a sliding region 20 formed on its inner surface. The curved support 14, in contrast to the representation in FIG. 1a, in which it is connected with the inner surface 23 of the hollow shaft 8, is replaceably connected, in the present case, with the face surface 22 of the hollow shaft 8, by way of an adapter connection 21. However, rotational mounting of the hollow shaft 8 can also take place by way of a further sliding surface 24 for the curved support 14 disposed on the inner surface of the holder 2. In this exemplary embodiment, the outer surface 25 of the curved support 14 is mounted so as to rotate on the sliding surface 24 of the holder 2, and secured against axial play.

Figure 1C:
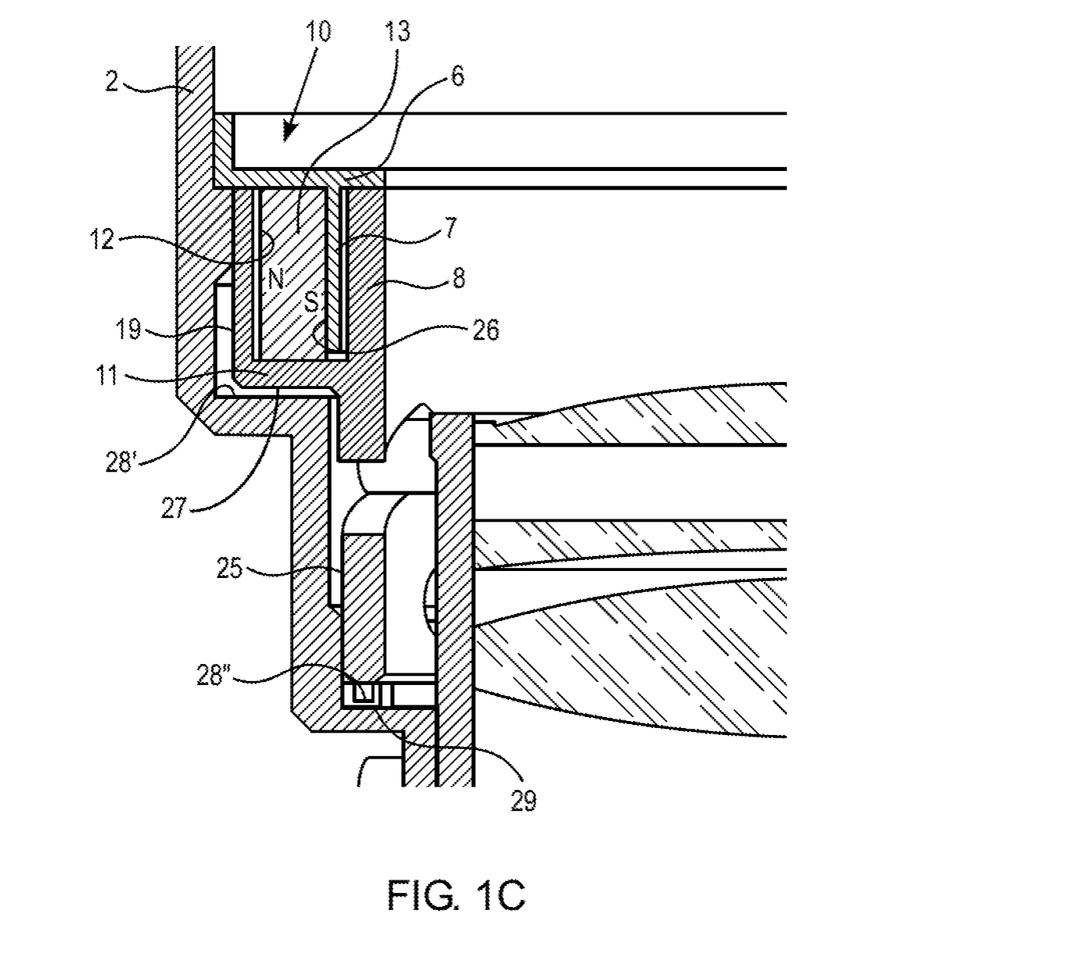

FIG. 1c shows a further detail enlargement of FIGS. 1a and 1b. The structure in the region of the hollow-shaft drive 5 is made clear. Here, magnets 13 are disposed on the inner wall surfaces 12 of the cylinder element 11, in the groove 10. The orientation of the polarity is represented with N and S and runs in the axial direction, in other words from the inside to the outside. The gap between inner wall surface 12 and magnet 13 is filled with an adhesive that forms a connection between magnet 13 and inner wall surface 12. The coil 7 is inserted into an air gap between magnet 13 and outer wall surface 26 of the hollow shaft 8 of the cylinder element 11. The coil 7 is connected with a stator 6 that covers the groove 10, which stator is screwed into the holder 2.

In the axial direction, the cylinder element 11 is mounted on a projection 28' with its outer bottom surface 27. In addition or alternatively, the axial mounting can also take place on a projection 28" corresponding to the face surface 29 of the curved support 14. The counter-bearing to this takes place between cylinder element 11 and stator 6.

Figure 2A:
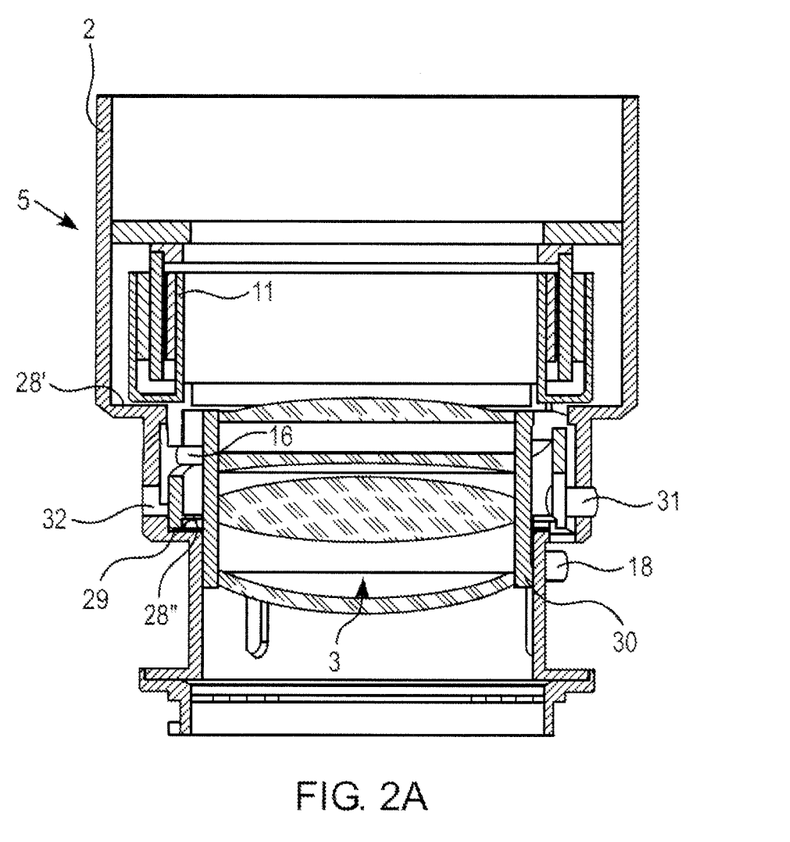

In FIG. 2a, a variant of the hollow-shaft drive 5 according to the invention is shown. In this embodiment, the cylinder element 11 that forms the circumferential groove 10 is structured as a separate component and is attached to a curved support groove formed into the end of the curved support 14 that lies opposite the face surface 29. At this location, which performs the function of the adapter connection 21 described in FIG. 1b, replacement of different curved supports 14 can take place in simple manner. In FIG. 2a, no axial mounting of the rotor 9 formed by cylinder element 11 and curved support 14 on projections 28' and 28" in the holder 2 takes place as shown in FIG. 1. In this embodiment, axial mounting takes place by way of guide elements 31, which stand in engagement with a circumferential curve 32 introduced into the holder 2. Preferably, three guide elements 31, for example structured as cylinder rollers, are provided, offset by 120° on the circumference of the curved support 14.

This manner of axial mounting of the rotor 9 can also be used in the embodiments according to FIG. 1, wherein the guide elements 31 are preferably provided in the region of the face surface 29 of the curved support 14.

Figure 2B:
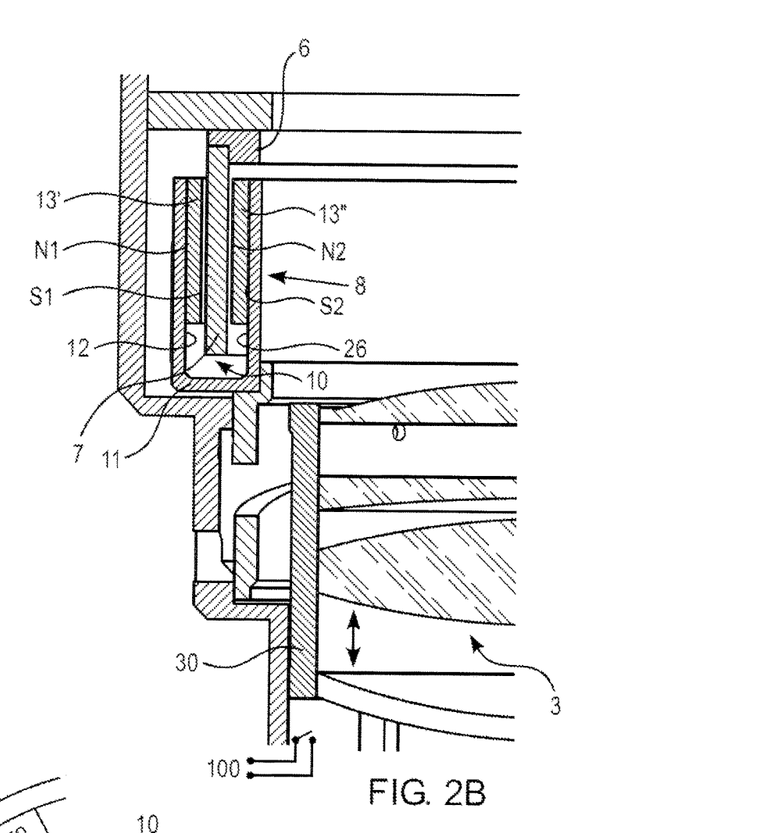

FIG. 2b shows a further detail enlargement to illustrate the positioning of the magnets 13', 13". The polarity of the magnets is represented with N1, S1 of the magnet 13' and N2, S2 of the magnet 13", in order to illustrate the direction of the magnetic flux. The holder 30 of the optical element is mounted so as to be displaceable in the direction of the arrows. For detection of the end position of the axial displacement of the optical element 3, an end-position sensor 100 assigned to the holder 30 is shown schematically.

Figure 2C:
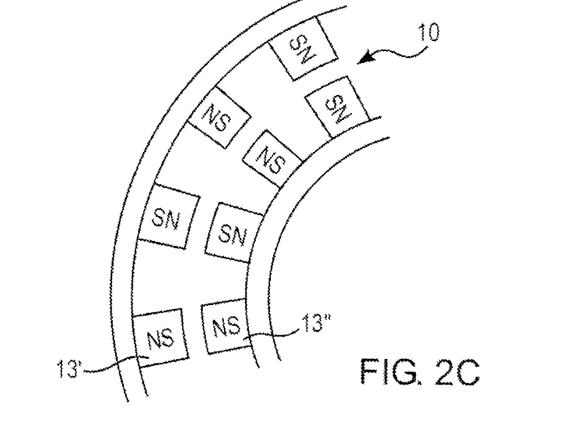

The alternating arrangement of the polarity of further magnets 13', 13" disposed on the circumference of the groove 10 is shown schematically in FIG. 2c.

Figure 3:
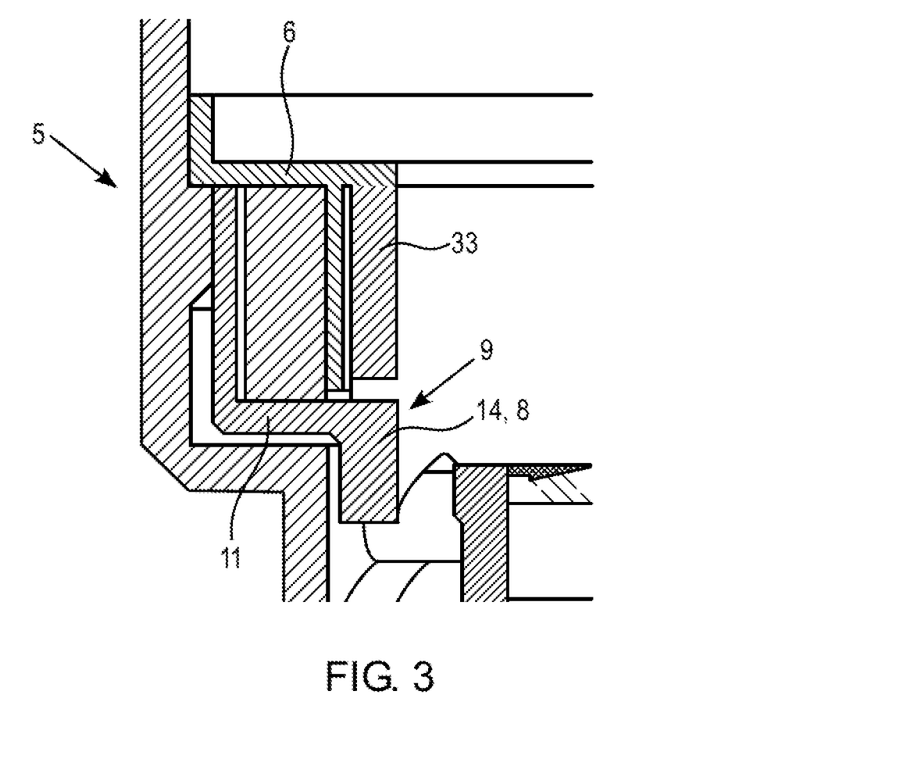

The different exemplary embodiments show that the invention is not restricted to the hollow-shaft drive 5 of the embodiment according to FIG. 1a, in which the rotor 9 can be configured in one piece, consisting of functionally characterized partial regions, such as cylinder element 11, hollow shaft 8, and curved support 14, but also in the manner according to FIG. 1b, in which the curved support 14 (no longer as a formed-on part of the hollow shaft 8) can instead be released from the hollow shaft 8 by way of an adapter connection 21. In this embodiment, the inner circumference of the cylinder element 11 functionally forms the hollow shaft 8 to which the curved support 14 can be attached. A further embodiment of the invention, in which the rotationally moved mass is advantageously reduced, is shown in FIG. 3.

The cylinder part 33, which forms the inner circumference of the cylinder element 11 (in FIGS. 1 and 2), is separated from the cylinder element 11 in this embodiment, and, together with the coil 7, is attached to the stator 6 and therefore can no longer rotate. In this variant, the region of the hollow shaft 8, as defined in the embodiments according to FIGS. 1 and 2, functionally coincides with the curved support 14. The hollow shaft 8/curved support 14 region is attached or formed on the cylinder element 11, which is mounted so as to rotate, and in this manner forms the rotor 9. The cylinder part 33 and the cylinder element 11 together form the groove 10 described above.

Figure 4:
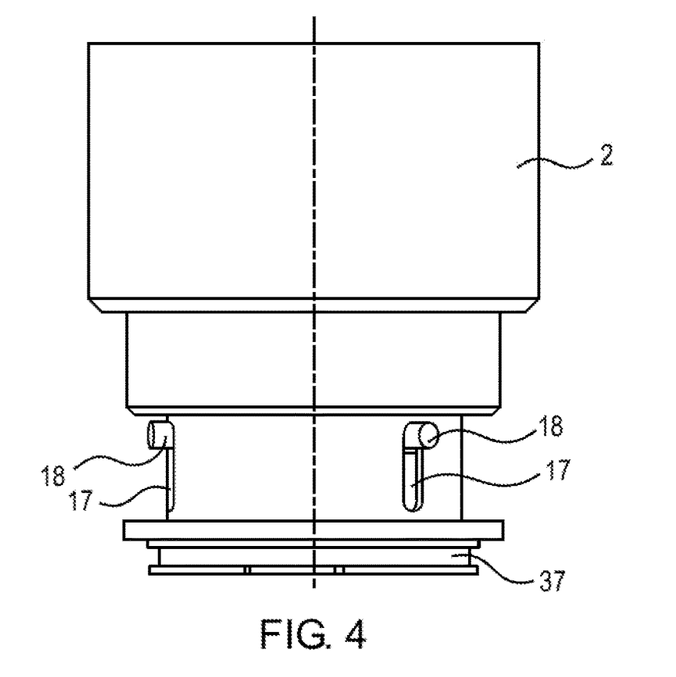
Figure 5:
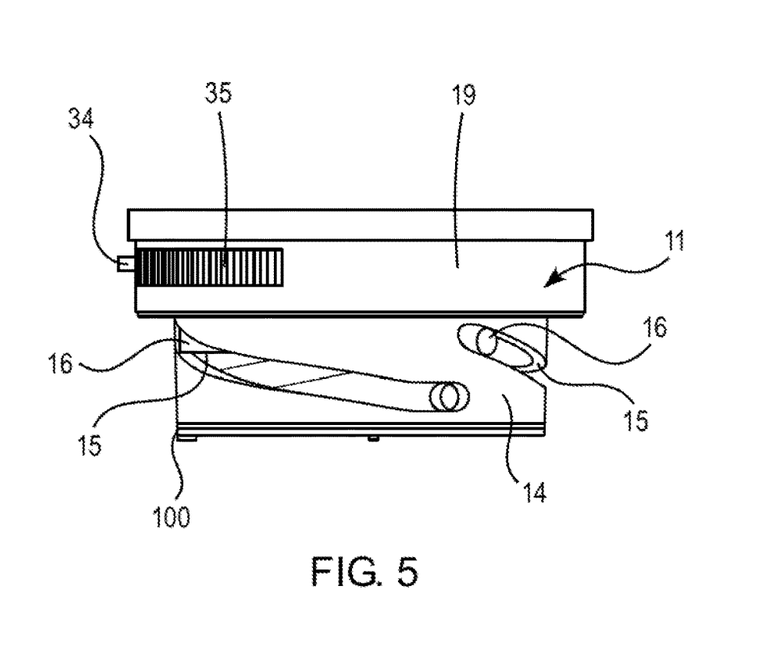

In FIG. 4, the holder 2 is shown schematically. Linear guide elements 18 for the optical element 3 are mounted so as to be axially displaceable in linear guides 17, FIG. 5 schematically shows a sensor 34 that measures incrementally or absolutely and is attached to the holder 2, not shown in this figure. The sensor 34 works together with the bar ruler 35 disposed on the circumference of the cylindrical element 11, and generates signals for a determination of the rotational position of the cylinder element 11. Together with the incline of the curved contour 15 in the curved support 14, the axial position of the optical element 3, not shown here, can be determined. The optical element 3 is axially displaced by means of the guide elements 16 that engage into the curved contour 15, during rotation of the curved support 14. The signals of the sensor 34, together with control and regulation electronics for the hollow-shaft drive 5, not shown here, can be used as an axial positioning device for optical elements.

Figure 6:
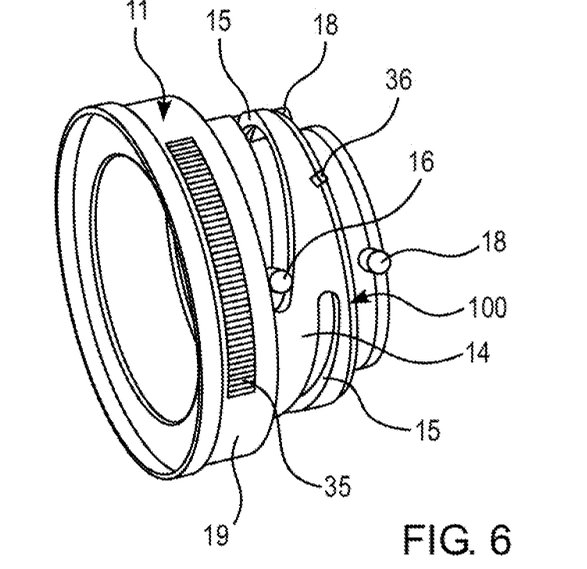

In FIG. 6, a perspective view of the cylinder element 11 is shown, on the outer circumference surface 19 of which the bar ruler 35 is disposed. The guide elements 16 run in the curve contour 15 for axial displacement of the optical element 3 mounted in the interior. The linear guide elements 18 work together with the linear guide 17, not shown here. An end-position sensor 100 is structured as a micro-button or optical interrupter of a forked photoelectric sensor 36.

Figure 7:
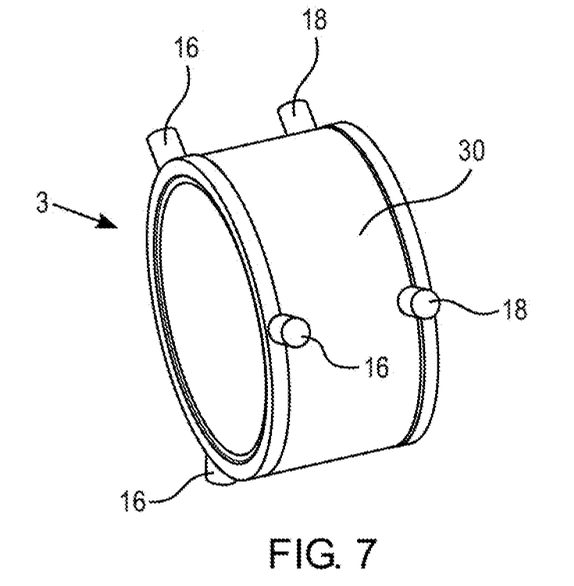

FIG. 7 shows the holder 30 of the optical element 3 as an open hollow cylinder. In the region of the respective face surfaces, the guide elements 16 for engagement in the curved contour 15 of the curved support 14 and the linear guide elements 18 for engagement in the linear guide 17 of the holder 2 are shown.

Figure 8:
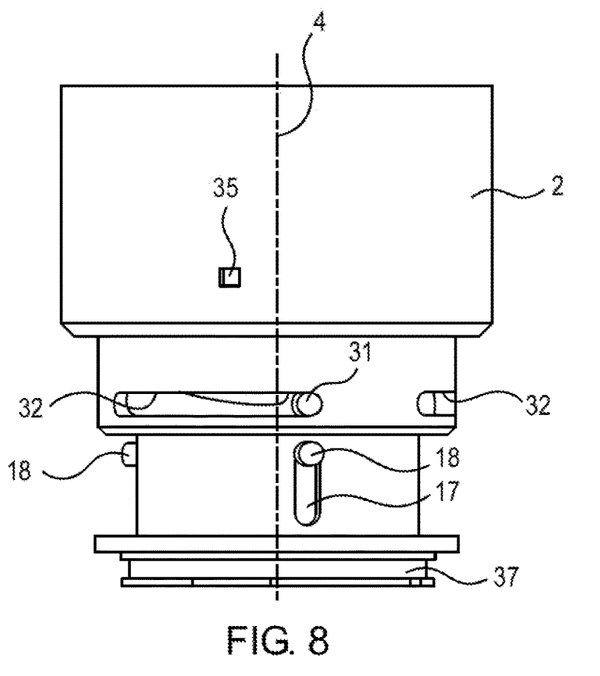

In FIG. 8, a holder 2 of a design variant according to FIG. 2, with axial mounting of the rotor, not shown here, in a circumferential curve 32 is shown. A sensor 34 for the incremental sensor system for detection of the rotational position of the rotor is introduced into the holder 2. Three segments of a circumferential curve 32 are formed in the holder 2. Guide elements 31 connected with the curved support 14, not shown here, are guided in the circumferential curve 32 for axial mounting. The circumferential curve 32 is formed on the holder 2, on the circumference, normal to the optical axis 4, while the linear guide 17 runs orthogonally to it and parallel to the optical axis 4. Linear guide elements 18 are mounted in the linear guide. A bayonet 37 for coupling to a camera, not shown in any detail, is attached in the lower region of the holder 2.

Figure 9:
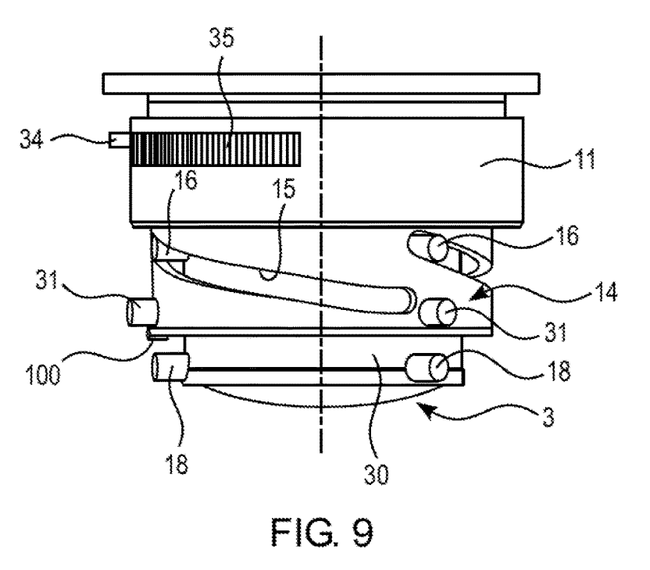

FIG. 9 shows the cylindrical element 11 with bar ruler 35 and the sensor 34 attached to the holder 2, not shown in the present case. Curved contours 15 are formed in the curved support 14. Guide elements 16, which are attached to the holder 30, are guided in the curved contours. Guide elements 31, which engage into the circumferential curve 32 of the holder 2, not shown here, are attached to the curved support 14. An end-position sensor 100 is attached to the curved support. The holder 30 of the optical element 3 has linear guide elements 18 that engage into linear guides 17, not shown here.

Figure 10:
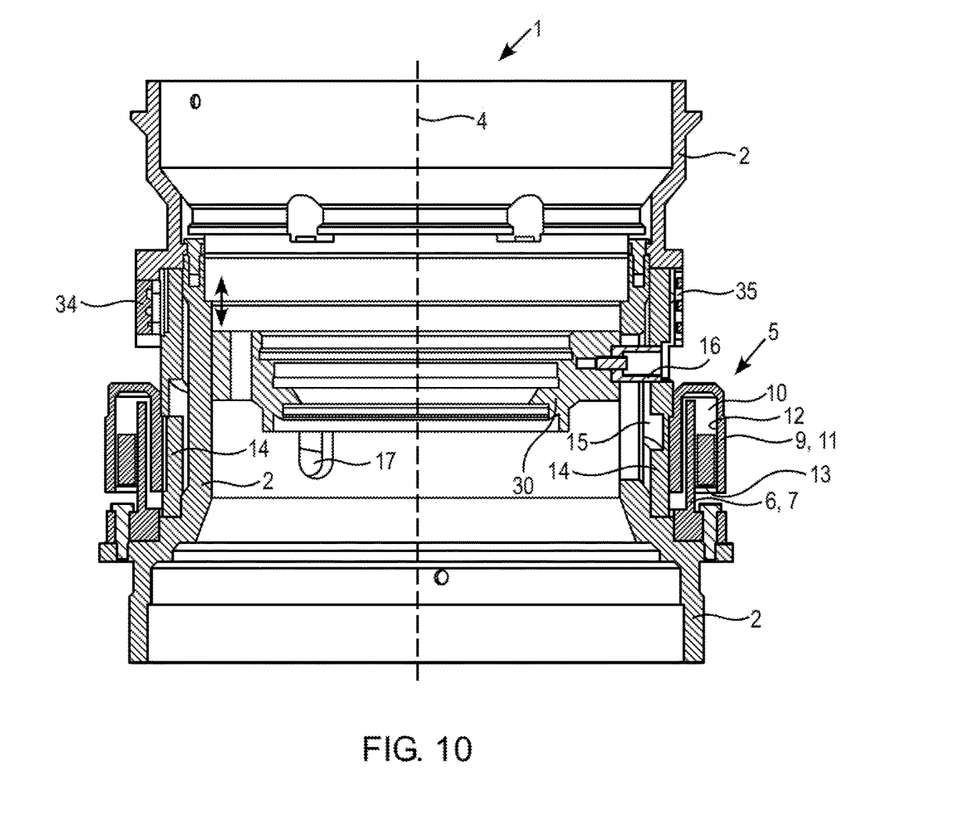

FIG. 10 shows a schematic diagram of the objective 1 with all the parts essential to its function, in cross-section. Optical elements 3 in an inner holder 30 are held in an outer holder 2 of the objective 1. The inner holder 30 is mounted so as to be linearly guided in a linear guide 17 present in the outer holder 2 and axially displaceable in a curved contour 15, by way of guide elements 16. The curved support 14 can be driven to rotate by an electric motor.

A hollow-shaft drive 5 is present as a drive for the curved support.

The rotor 9 of the hollow-shall drive 5 is connected with the curved support 14. The stator 6 of the hollow-shaft drive 5 is connected with the outer holder 2, in locally fixed manner. The rotor 9 is configured as a cylinder element 11 in the form of a circumferential groove 10. Permanent-magnet elements 13 are disposed on at least one inner wall surface 12 of the cylinder element 11.

The stator 6 of the hollow-shaft drive 5 consists of a thin-walled cylindrical coil 7, which dips into the groove 10 for electromagnetic interaction with the magnetic elements 13, coaxially to the optical axis 4 as the axis of rotation of the curved support 14.

Protection is requested not only for the embodiments shown here, although the variants presented and described are most universally usable. Because the electrical connection lines are affixed to the non-moving part of the hollow-shaft drive, the stator, rotations of more than 360° are fundamentally possible, as long as curves or other mechanical stops do not artificially restrict the rotation. Long focusing movements or adjustments are easily possible with a corresponding gear mechanism and circumferential curves. In an embodiment not described further, however, it is also conceivable that the electrical feed lines are connected to the moving part. In this case, the magnets would be attached to the holder and a part of the stator and the coil would dip into the circumferential groove, but would be attached to the moving part of the motor, and accordingly form part of the rotor. The possible angle of rotation of this hollow-shaft motor is restricted by the length and flexibility of the electrical connection lines for the control signal feed to the coils.

REFERENCE SYMBOL LIST 1 objective
2 holder of objective (outer holder)
3 optical element
4 optical axis
5 hollow-shaft drive
6 stator
7 coil
8 hollow shaft
9 rotor
10 groove
11 cylinder element
12 inner wall surface
13, 13', 13" permanent magnets
14 curved support
15 curve contour
16 guide element
17 linear guide
18 linear guide element
19 outer circumference surface
20 sliding region
21 adapter connection
22 face surface of hollow shaft
23 inner surface
24 sliding surface
25 outer surface
26 outer wall surface
27 outer bottom surface
28', 28" projection
29 face surface of curved support
30 holder of optical elements (inner holder)
31 axial guide element
32 circumferential curve
33 cylinder part
34 sensor
35 bar ruler
36 forked photoelectric sensor
37 bayonet
100 end-position sensor

The invention claimed is:

1. An objective arrangement comprising:
an outer holder; and
optical elements held therein, in an inner holder, wherein the inner holder is linearly guided in the outer holder and mounted so as to be axially displaceable in a curved support member,
the curved support member is drivable by an electric motor, such that when the curved support member is rotated, the optical elements displaced along an optical axis,
a hollow-shaft drive drives the curved support member, which drive consists of a rotor connected with the curved support member and a stator connected with the outer holder,
the rotor is configured as a cylinder element forming a circumferential groove, having permanent-magnet elements disposed on at least one inner wall surface,
the stator consists of a cylindrical coil, which inserted into the groove, locally fixed in the axial direction, for an electromagnetic interaction with the magnet elements, coaxially to the axis of rotation of the curved support member, and
the outer holder contacts the curved support member and the inner holder.

2. The objective arrangement according to claim 1, wherein the axis of rotation of the curved support member coincides with the optical axis of the objective, and that the movement of the optical elements takes place linearly, bidirectionally along the optical axis.

3. The objective arrangement according to claim 2, wherein the curved support member is replaceably connected with the face surface of the rotor.

4. The objective arrangement according to claim 1, wherein the curved support member is connected with a face surface of the rotor.

5. The objective arrangement according to claim 1, wherein an outer circumference surface of the cylinder element or an outer surface of the curved support member is mounted in the outer holder so as to rotate.

6. The objective arrangement according to claim 1, wherein the outer bottom surface of the cylinder element lies on a projection in the outer holder for axial alignment of the hollow-shaft drive, wherein the stator covers the open side of the groove.

7. The objective arrangement according to claim 1, wherein guide elements are disposed on the curved support member or the outer circumferential surface of the cylinder element, which elements engage into at least one circumferential curve that runs normal to the optical axis, formed in the outer holder, for axial mounting of the curved support member and/or of the rotor.

8. The objective arrangement according to claim 1, wherein magnets with alternating polarity are disposed in the groove, on both sides of the inner wall surface of the cylinder element, in such a manner that an air gap is formed between them, to accommodate the cylindrical coil of the stator.

9. The objective arrangement according to claim 1, wherein end-position sensors that measure absolutely, for detection of the end positions of the optical elements in the axial direction, and the sensors that measure absolutely or incrementally, for unambiguous detection of the axial intermediate positions of the curved support member in or on the outer holder, are present.

10. The objective arrangement according to claim 1, wherein the transfer of force and movement between hollow-shaft drive and optical elements to be axially displaced is configured as a direct drive, without step-up or step-down gear mechanisms.

* * * * *